US008032830B2

(12) United States Patent
Siegel et al.

(10) Patent No.: US 8,032,830 B2
(45) Date of Patent: *Oct. 4, 2011

(54) SYSTEM AND METHOD FOR GENERATING QUOTATIONS FROM A REFERENCE DOCUMENT ON A TOUCH SENSITIVE DISPLAY DEVICE

(75) Inventors: Marc Siegel, Boston, MA (US); Albert Ho, Westford, MA (US); Christopher Tossing, Waltham, MA (US)

(73) Assignee: KD Secure LLC, Tallahassee, FL (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/507,071

(22) Filed: Jul. 22, 2009

(65) Prior Publication Data
US 2010/0153833 A1 Jun. 17, 2010

Related U.S. Application Data

(60) Provisional application No. 61/122,632, filed on Dec. 15, 2008.

(51) Int. Cl.
*G06F 17/24* (2006.01)
(52) U.S. Cl. ...................................................... 715/255
(58) Field of Classification Search .................... 715/255
See application file for complete search history.

(56) References Cited

U.S. PATENT DOCUMENTS

| | | | | |
|---|---|---|---|---|
| 5,732,230 A * | 3/1998 | Cullen et al. | ................. | 715/764 |
| 6,262,732 B1 * | 7/2001 | Coleman et al. | ............. | 715/835 |
| 6,665,490 B2 * | 12/2003 | Copperman et al. | .......... | 386/241 |
| 7,038,714 B1 * | 5/2006 | Parulski et al. | ............ | 348/207.2 |
| 7,479,949 B2 * | 1/2009 | Jobs et al. | ..................... | 345/173 |
| 7,489,321 B2 * | 2/2009 | Jetha et al. | .................... | 345/620 |
| 7,851,758 B1 * | 12/2010 | Scanlon et al. | ............... | 250/330 |
| 2001/0047283 A1 * | 11/2001 | Melick et al. | ...................... | 705/8 |
| 2002/0025085 A1 * | 2/2002 | Gustafson et al. | ............ | 382/311 |
| 2003/0069716 A1 * | 4/2003 | Martinez | ...................... | 702/188 |
| 2003/0153991 A1 * | 8/2003 | Visser et al. | .................... | 700/79 |
| 2003/0229858 A1 * | 12/2003 | Keohane et al. | .............. | 715/526 |
| 2004/0095375 A1 * | 5/2004 | Burmester et al. | ............ | 345/716 |
| 2004/0177326 A1 * | 9/2004 | Bibko et al. | .................. | 715/530 |
| 2005/0040224 A1 * | 2/2005 | Brinton et al. | ................ | 235/376 |
| 2006/0132836 A1 * | 6/2006 | Coyne | .......................... | 358/1.15 |
| 2006/0139372 A1 * | 6/2006 | Orofino, II | .................... | 345/629 |
| 2006/0218492 A1 * | 9/2006 | Andrade | ....................... | 715/523 |

(Continued)

OTHER PUBLICATIONS

Malik, Shahzad, "An Exploration of Multi-Finger Interaction on Multi-Touch Surfaces", 2007.*

*Primary Examiner* — Laurie Ries
*Assistant Examiner* — Frank D Mills
(74) *Attorney, Agent, or Firm* — American Patent Agency; Daniar Hussain; Ryan Abbott (57) ABSTRACT

The present invention is a system and method for generating quotations from a reference document on a touch sensitive display device or other handheld device, including the following steps: (a) providing a reference document; (b) displaying the reference document; (c) capturing an image of a portion of the reference document; (d) editing the captured portion of the reference document; and (e) generating a quotation comprising an image quotation and a bibliographical reference to a referenced portion of the reference document. The present invention may be used in Apple iPhones®, handheld devices that inspectors may use to quote reference documents to substantiate statements of problems found during industrial inspections, and in other purposes.

20 Claims, 10 Drawing Sheets

U.S. PATENT DOCUMENTS

| | | | | |
|---|---|---|---|---|
| 2006/0235611 A1* | 10/2006 | Deaton et al. | ............... | 701/207 |
| 2006/0259471 A1* | 11/2006 | Droubie et al. | .................. | 707/3 |
| 2007/0002929 A1* | 1/2007 | Frankel et al. | ............... | 374/121 |
| 2007/0027704 A1* | 2/2007 | Patel et al. | .......................... | 705/1 |
| 2007/0230750 A1* | 10/2007 | Ikeda et al. | ................. | 382/123 |
| 2007/0288859 A1* | 12/2007 | Vuong et al. | ................. | 715/770 |
| 2008/0052377 A1* | 2/2008 | Light | ........................... | 709/218 |
| 2008/0052945 A1* | 3/2008 | Matas et al. | .................... | 34/173 |
| 2008/0123934 A1* | 5/2008 | Amidi | ......................... | 382/141 |
| 2008/0134161 A1* | 6/2008 | Chamieh et al. | ............. | 717/166 |
| 2009/0051502 A1* | 2/2009 | Craik | ........................ | 340/10.51 |
| 2009/0051946 A1* | 2/2009 | Hibi | ............................ | 358/1.9 |
| 2009/0102809 A1* | 4/2009 | Mamba et al. | ............... | 345/173 |
| 2009/0141964 A1* | 6/2009 | Magara | ........................ | 382/141 |
| 2009/0157521 A1* | 6/2009 | Moren et al. | .................... | 705/26 |
| 2009/0256693 A1* | 10/2009 | Brinton et al. | ............... | 340/439 |
| 2009/0262072 A1* | 10/2009 | Chen | ............................ | 345/157 |
| 2009/0273571 A1* | 11/2009 | Bowens | ....................... | 345/173 |
| 2009/0284542 A1* | 11/2009 | Baar et al. | ..................... | 345/589 |
| 2010/0026718 A1* | 2/2010 | Jetha et al. | ................... | 345/647 |
| 2010/0156913 A1* | 6/2010 | Ortega et al. | ................. | 345/520 |
| 2010/0165097 A1* | 7/2010 | Garvey | ........................... | 348/92 |
| 2010/0179428 A1* | 7/2010 | Pedersen et al. | ............. | 600/443 |
| 2010/0211902 A1* | 8/2010 | Unsworth et al. | ............ | 715/769 |

* cited by examiner

SYSTEM AND METHOD FOR GENERATING QUOTATIONS FROM A REFERENCE DOCUMENT ON A TOUCH SENSITIVE DISPLAY DEVICE

REFERENCE TO RELATED APPLICATIONS

This application claims priority from provisional application Ser. No. 61/122,632, filed on Dec. 15, 2008, and entitled "A system, method and apparatus for inspections and compliance verification of industrial equipment using a handheld device," the entirety of which is hereby incorporated by reference herein. This application is related to co-pending application Ser. No. 12/489,313, filed on Jun. 22, 2009, and entitled "A system and method for carrying out an inspection or maintenance operation with compliance tracking using a handheld device," the entirety of which is hereby incorporated by reference herein. This application is also related to co-pending application Ser. No. 12/507,039, filed on Jul. 21, 2009, and entitled "A system and method for cropping and annotating images on a touch sensitive display device," the entirety of which is hereby incorporated by reference herein.

FIELD OF THE INVENTION

The present invention is generally related to user-interfaces for touch-sensitive displays. More specifically, the instant invention relates to a system and method for generating quotations from a reference document on a touch sensitive display device or other handheld device.

BACKGROUND OF THE INVENTION

Generating quotations from reference documents is important in graphic user interfaces (GUIs), both when writing reports, documents, encyclopedia articles, and the like using WordPerfect®, Microsoft Word®, and the like, and also for cropping and annotating quotations from textual reference documents such as Adobe Portable Document Format (PDF) ®, Microsoft Word®, and the like.

Multiple end-use applications require generating quotations from reference documents, including reference manuals, encyclopedias, educational texts, inspection reports, and the like. For example, U.S. Ser. No. 12/489,313, filed on Jun. 22, 2009, entitled "A system and method for carrying out an inspection or maintenance operation with compliance tracking using a handheld device," describes a method for carrying out an inspection on a piece of industrial equipment and generating inspection reports in the field. An inspector out in the field carrying out an inspection operation needs a convenient, quick, and accurate method to crop and annotate quotations from a reference document, such as an industrial equipment owner's manual, during an inspection in the field.

Figure 1:
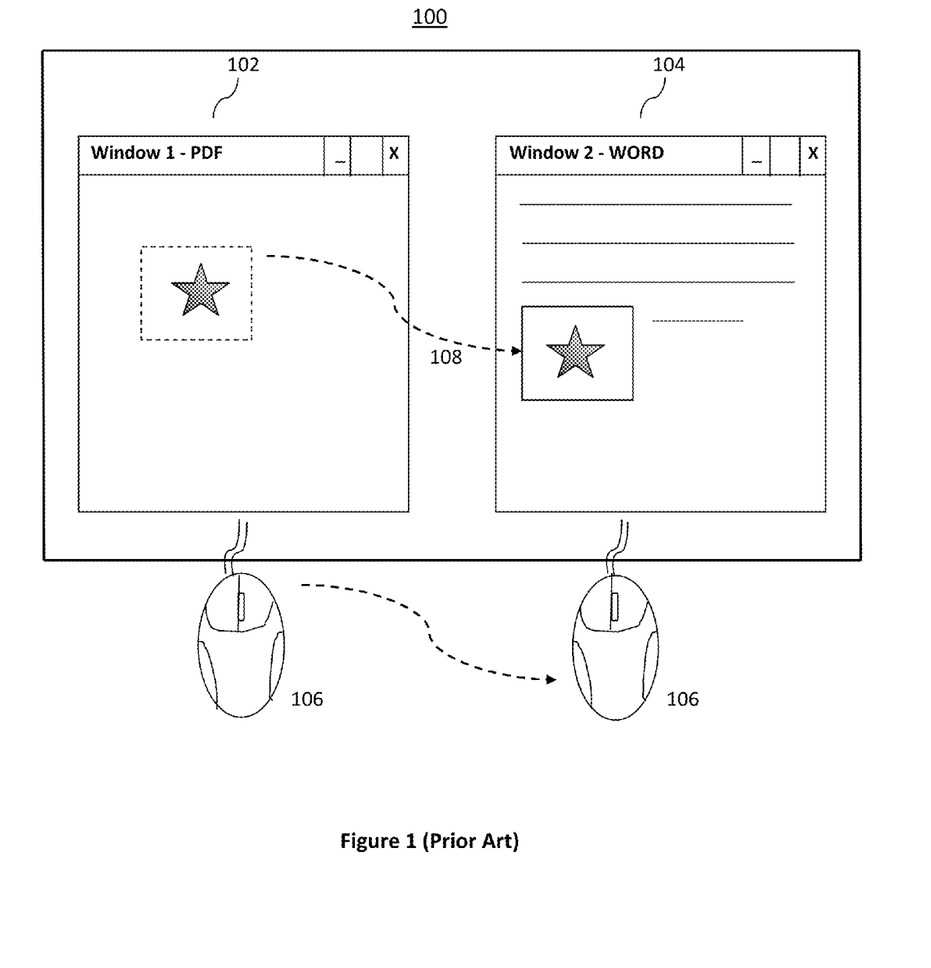
FIG. 1 shows a prior art method of generating quotations from a reference document in a desktop or other like environment using a mouse or other like peripheral device.

One prior method of generating quotations from a reference document is shown in FIG. 1. Window 1 (102) shows a reference document, which could be, for example, an Adobe PDF® file, stored in memory. A mouse 106 is used to select a portion of the reference document (shown as dashed rectangle), then performing a drag operation 106 (shown as dashed line 106) while holding down the mouse button to another Window 2 (104), which could be, for example, a Microsoft Word® document that the user is editing, and then releasing the mouse button to insert the quotation from the reference document. In the prior art method, after the quotation area has been selected, the user drags the selected quotation into another document, and then must manually add a reference to the reference document, as well as the section of the reference document from which the quotation was selected. This operation is cumbersome and requires multiple mouse operations, and furthermore is generally only useable in the desktop environment with the availability of peripheral devices such as a keyboard and mouse. It is generally not suitable for use in a handheld or other field device, or locations or situations where greater flexibility and fewer interactions with the GUI are highly desirable.

One concrete application of the present invention is related to supplying a convenient user interface for a handheld device used for industrial inspection and maintenance compliance systems, as described in related U.S. Ser. No. 12/489,313. The present invention allows an easy mechanism for on-site inspectors to quickly quote reference documents such as crane safety manuals to substantiate problems found during the course of an inspection.

One of ordinary skill in the art will find many useful applications of the present invention in which a convenient and easy way is needed to generate quotations from a reference document on a touch-sensitive display or other hand-held device.

It is against this background that various embodiments of the present invention were developed.

BRIEF SUMMARY OF THE INVENTION

The present invention is a system and method for cropping and annotating images on a touch sensitive display device or other handheld device.

Accordingly, and according to one embodiment of the present invention, disclosed herein is a method for generating quotations from a reference document, including the steps of (a) providing a reference document; (b) displaying the reference document; (c) capturing an image of a portion of the reference document; (d) editing the captured portion of the reference document; and (e) generating a quotation comprising an image quotation and a bibliographical reference to a referenced portion of the reference document.

According to another embodiment of the present invention, disclosed herein is the method as described above where editing the captured portion of the reference document also includes cropping the captured image.

According to another embodiment of the present invention, disclosed herein is the method as described above where editing the captured portion of the reference document also includes annotating the captured image.

According to another embodiment of the present invention, disclosed herein is the method as described above where cropping the captured image also includes (a) displaying the captured image to be cropped; (b) receiving a first input from a user designating a first point in the image defining a corner of a crop rectangle; (c) receiving a second input from the user designating a second point in the image defining an opposite corner of the crop rectangle; and (d) cropping the captured image from the first point to the second point when the second input is released.

According to another embodiment of the present invention, disclosed herein is the method as described above where if a user does not immediately release the second input, allowing the user to drag the second point to visually edit a shape and a size of the crop rectangle.

According to another embodiment of the present invention, disclosed herein is the method as described above where if a user drags the second point near an edge of the displayed image and the image is larger than the displayed portion, then scrolling the displayed portion to show area of the image in a direction of the dragged point.

According to another embodiment of the present invention, disclosed herein is the method as described above where annotating of the captured image also includes (a) displaying the captured image to be annotated; (b) receiving a first input from a user designating a first point in the image defining a corner of the annotation; (c) receiving a second input from the user designating a second point in the image defining an opposite corner of the annotation; and (d) annotating the captured image from the first point to the second point when the second input is released.

According to another embodiment of the present invention, disclosed herein is the method as described above also including the step of displaying a shape corresponding to the annotation of the captured image before annotating the captured image.

According to another embodiment of the present invention, disclosed herein is the method as described above where if a user does not immediately release the second input, allowing the user to drag the second point to visually show a shape and a size of the annotation area.

According to another embodiment of the present invention, disclosed herein is the method as described above where if a user drags the second point near an edge of the displayed image and the image is larger than the displayed portion, then scrolling the displayed portion to show area of the image in a direction of the dragged point.

According to another embodiment of the present invention, disclosed herein is the method as described above where when a user selects an undo action after a crop operation has been completed, the entire original captured image is displayed.

According to another embodiment of the present invention, disclosed herein is the method as described above where when a user selects an undo action a second time after a crop operation has been completed, the original reference document is displayed again.

According to another embodiment of the present invention, disclosed herein is the method as described above also including the step of generating a computer-readable link that refers back to the referenced portion of the reference document.

According to another embodiment of the present invention, disclosed herein is the method as described above where if text selection is meaningful for the reference document, a user can perform a text quotation.

According to another embodiment of the present invention, disclosed herein is the method as described above where the text quotation is obtained by selecting a region of text.

According to another embodiment of the present invention, disclosed herein is the method as described above where the selected text may be edited by the user.

According to another embodiment of the present invention, disclosed herein is the method as described above where after the user finalizes the text quotation, the edited text is saved along with a bibliographic reference to the referenced portion of the reference document.

The present invention also includes a related system by which the method of generating quotations from reference documents could be carried out. Such a system could be implemented as a computer system, embodied in a handheld device. The system may include integrated or separate hardware components for receiving reference documents and means for receiving touch input.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The present invention generally pertains to a system and method for generating quotations from a reference document on a touch sensitive display or other handheld device.

The interface according to the principles of the present invention could have, but is not limited to, the following components. Any subsets of the following components are also within the scope of this invention.

After a user navigates to a desired section of document, the user can choose to make a graphical quotation by the following steps:

1. An image is captured of the displayed output of the viewed document, comprising some or all of the portion on-screen, and some or all of the portion off-screen;
2. The image is then edited using the IMAGE INTERFACE (see FIG. 3), initially set with the crop such that the displayed image area is identical to the portion that was on-screen at the point of capture;
3. If the user clicks once on UNDO, it will show the entire captured image within the IMAGE INTERFACE (see FIG. 3), and if the user clicks a second time on UNDO, it will return to navigation within the source document;
4. The quotation may be annotated using the ANNOTATION INTERFACE (see FIG. 4);

5. When the user has finalized the quotation, the final edited image is saved along with a bibliographical reference to the referenced portion within the source document;
6. Additionally, a computer-readable link, such as hypertext, may be included linking back to the referenced portion in the source document.

If text selection is meaningful for a particular document type, the user may choose to make a text quotation by the following steps:

1. The user can select a region of text, such as by drawing a rectangle using the method from IMAGE INTERFACE (see FIG. 3);
2. The selected text can be edited by the user;
3. When the user finalizes the quotation, the edited text is saved along with a bibliographical reference to the referenced portion within the source document;
4. Additionally, a computer-readable link, such as hypertext, may be included linking back to the referenced portion in the source document.

The invention may be used in an industrial inspection compliance system with which various methods can be carried out to the effect of assisting in an inspection and providing the means for compliance verification of a proper inspection. For the purposes of the text describing this invention, an inspection may represent the process of checking a physical component for safety, security or business reasons, doing the same for compliance with industrial standards and guidelines, or a maintenance operation on a physical component for those same reasons. These methods can generally be best executed by a multi-function handheld device, carried to and used in the physical proximity of an inspection component by the inspector. Examples of multi-function handheld devices include the Apple iPhone®, the Psion Teklogix Workabout Pro®, the Motorola MC-75®, and the like, but the present invention is not limited to such devices as shown or described here. One embodiment of the inspection compliance method includes the steps of scanning unique machine-readable tags deployed at logical inspection points defined by the inspector, and assigning a timestamp to the scanning operation; taking media samples of logical inspection points defined by the inspector, and assigning a timestamp to the media sample capturing operation; reporting of sub-optimal conditions of the unique machine-readable tags deployed at logical inspection points if its condition warrants such a declaration; associating a media sample with a corresponding scan of a unique machine-readable tag; annotating a media sample in such ways that substantiate statements of an industrial component passing inspection, or in such ways that substantiate statements of problems found with the industrial component; and providing one or more quotations from one or more safety or operational reference manuals to substantiate statements of problems found during the inspection. See U.S. Ser. No. 12/489,313 for more details of an example of an industrial inspection compliance system to which the present invention may be applied.

The invention is discussed below with reference to FIGS. 1-8. However, those skilled in the art will readily appreciate that the detailed description given herein with respect to these figures is for explanatory purposes as the invention extends beyond these limited embodiments.

FIG. 1 shows a prior art method of generating quotations from a reference document in a desktop or other like environment using a mouse or other like peripheral device. Window 1 (102) shows a reference document, which could be, for example, an Adobe PDF® file, stored in memory. A mouse 106 is used to select a portion of the reference document (shown as dashed rectangle), then performing a drag operation 106 (shown as dashed line 106) while holding down the mouse button to another Window 2 (104), which could be, for example, a Microsoft Word® document that the user is editing, and then releasing the mouse button to insert the quotation from the reference document. In the prior art method, after the quotation area has been selected, the user drags the selected quotation into another document, and then must manually add a reference to the reference document, as well as the section of the reference document from which the quotation was selected. This operation is cumbersome and requires multiple mouse operations, and furthermore is generally only useable in the desktop environment with the availability of peripheral devices such as a keyboard and mouse. It is generally not suitable for use in a handheld or other field device, or locations or situations where greater flexibility and fewer interactions with the GUI are highly desirable.

In order to solve the inherent limitations in the prior art method described in FIG. 1, the inventors have invented a novel method, system, and apparatus to facilitate on-site quotations from reference documents.

Figure 2:
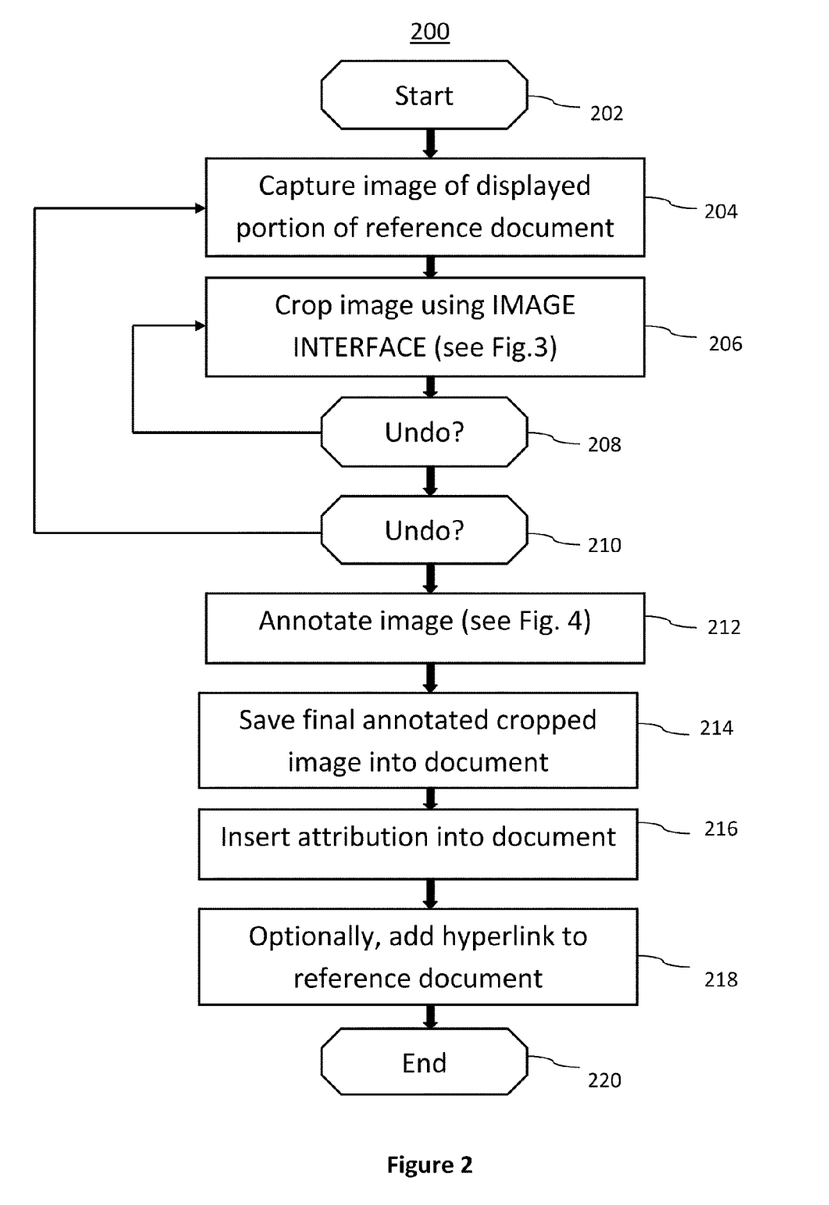
FIG. 2 shows a flowchart for generating quotations from a reference document using a simplified process on a handheld device, in accordance with one embodiment of the present invention.

FIG. 2 shows a flowchart for generating quotations from a reference document using a simplified process on a handheld device, in accordance with one embodiment of the present invention. The process 200 begins at step 202, where a reference document is provided to the process 200, either retrieved from memory or otherwise provided to process 200. The user is allowed to navigate to a portion in the reference document that contains either a graphical or textual quotation the user would like to quote and reference. Navigation may be performed by any method, including browsing as well as text search within the reference document. At step 204, an image is captured of a displayed portion of the reference document. The captured image is then presented (displayed) to the user, who may then proceed to edit/crop the captured image using the IMAGE INTERFACE described in greater detail in relation to FIG. 3 as shown in step 206. If the user has cropped the image, a single UNDO operation will return the user to the IMAGE INTERFACE where the user can redo the crop operation, as shown in step 208. If the user has cropped the image, two successive UNDO operations will return the user to the reference document, where the user can scan to a different portion of the reference document and select a different portion of the reference document for quotation. It is understood that if no editing has been performed by the user, a single UNDO operation will return the user to the reference document (not shown in FIG. 2).

Figure 4:
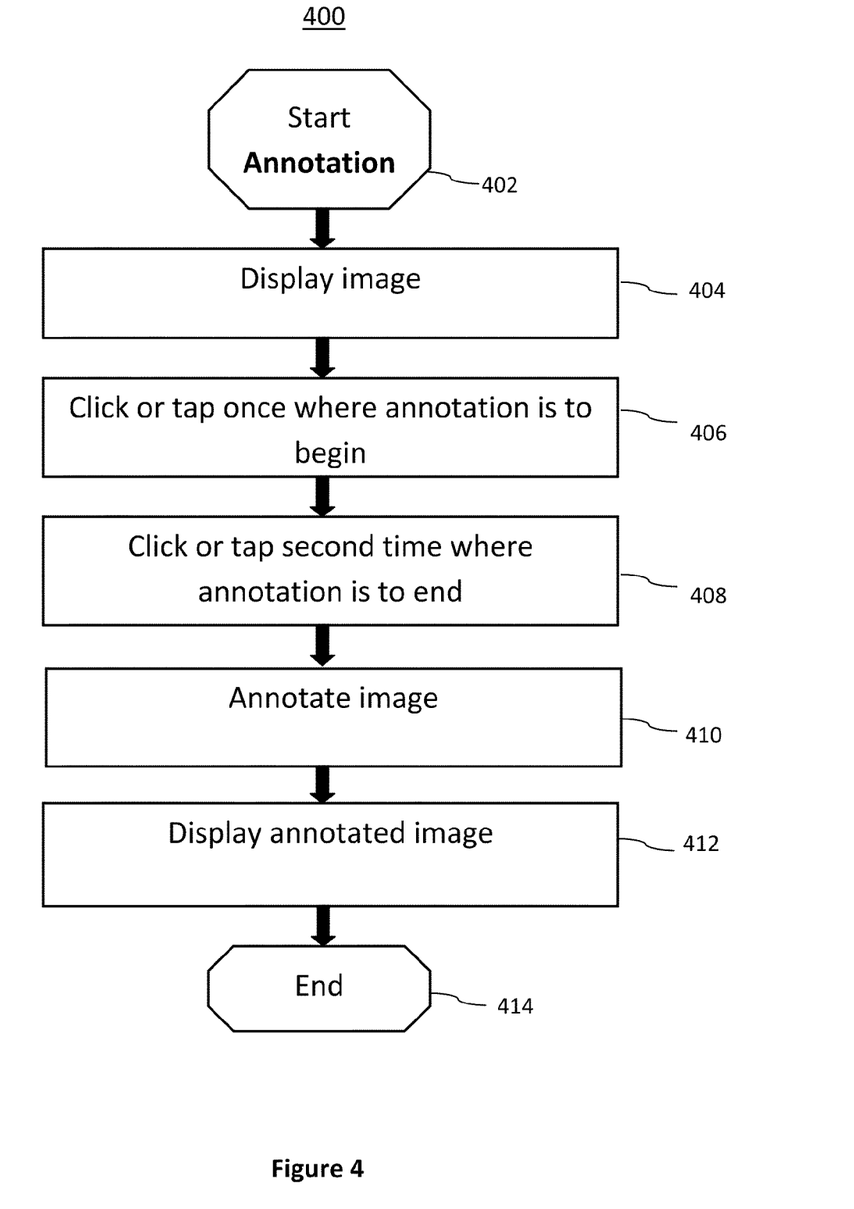
FIG. 4 shows a flowchart for annotating the quotation taken from the reference document using a simplified process on the handheld device, in accordance with the embodiment referenced in FIG. 2.

In step 212, the user can annotate the image using the ANNOTATION INTERFACE described in greater detail in relation to FIG. 4. The user can undo and redo the annotation of the quotation, or skip the annotation operation entirely (not shown in FIG. 2). In addition, the user can return to the edit/crop operation, as well as the original reference document by successfully performing the UNDO operation (not shown in FIG. 2).

In step 214, the final edited (annotated and cropped) quotation image is saved into a document the user is editing, for example, an inspection report, as shown in step 214. In step 216, an attribution (reference) is added which refers back to the referenced portion of the reference document. For example, a reference is added stating the name, title, and author of the reference document, as well as the section and page number where the quotation was taken from within the reference document. The format of the attribution may be changed by the user in a setting, and is not a limiting aspect of the present invention. Finally, optionally in step 218, a computer-readable hyperlink may be inserted into the document the user is editing that refers back to the reference document.

This provides a convenient manner in which the reference document may be retrieved when the document the user is editing is subsequently opened on a computer.

Figure 3:
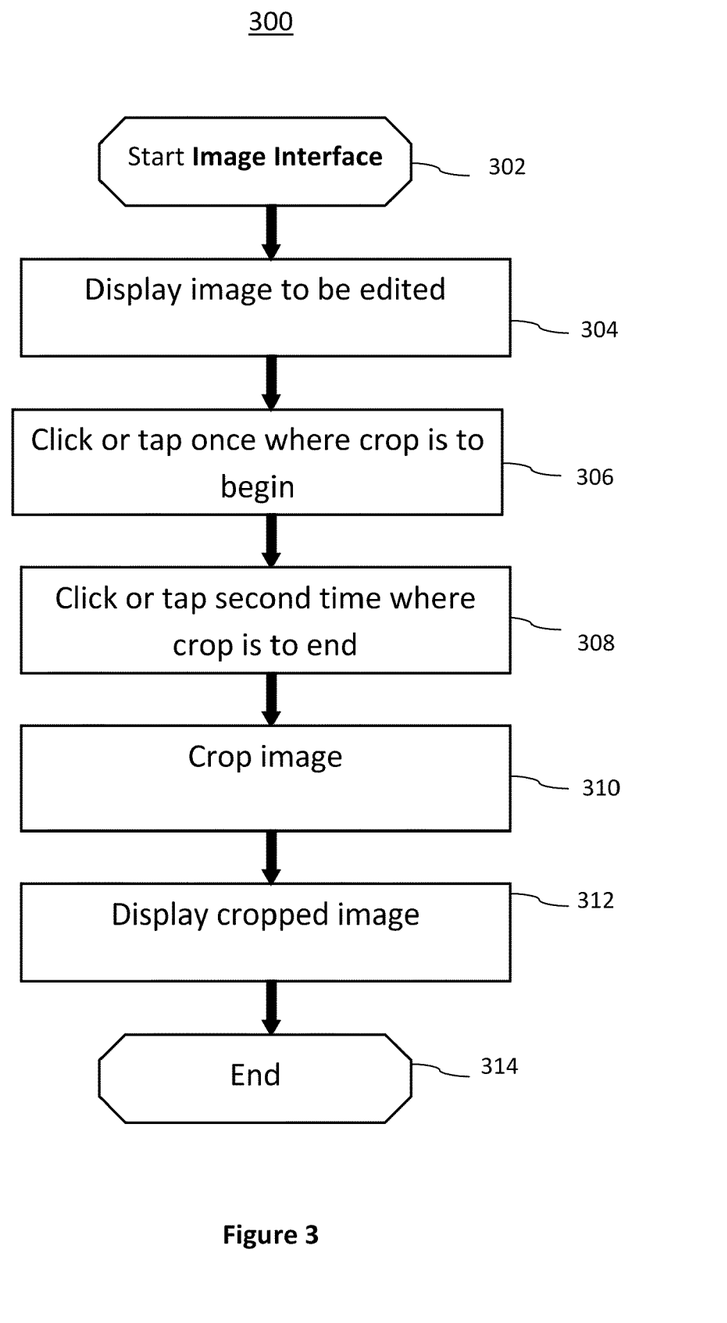
FIG. 3 shows a flowchart for cropping the quotation taken from the reference document using a simplified process on the handheld device, in accordance with the embodiment referenced in FIG. 2.

FIG. 3 shows a flowchart for cropping the quotation taken from the reference document using a simplified process on the handheld device ("IMAGE INTERFACE"), in accordance with the embodiment referenced in FIG. 2. Process 300 begins at step 302, where an image is captured of the reference document, or in some other way provided to the process 300. In step 304, the image of the reference document is displayed on the touch sensitive display or other display of the handheld device. In step 306, the user may click or tap (using a finger, a stylus, a mouse, or other device) at a lower-left hand (LLH) location where the crop is to begin. In step 308, the user may click or tap (using the finger, the stylus, the mouse, or other device) at an upper-right hand (URH) location where the crop is to end. In step 310, the image of the reference document is cropped between the LLH location and the URH location. Finally, in step 312, the cropped quotation of the reference document is displayed for the user's confirmation. At this point (not shown), the user may cancel, undo, or accept the quotation from the reference document. The process ends in step 314.

FIG. 4 shows a flowchart for annotating the quotation taken from the reference document using a simplified process on the handheld device ("ANNOTATION INTERFACE"), in accordance with the embodiment referenced in FIG. 2. Process 400 begins at step 402, where the cropped quotation from the reference document is retrieved from memory, retrieved directly from the IMAGE INTERFACE of FIG. 3, or in some other way provided to the process 400. In step 404, the quotation is displayed on the touch sensitive display or other display of the handheld device. In step 406, the user may click or tap (using a finger, a stylus, a mouse, or other device) at a LLH location where the annotation is to begin. In step 408, the user may click or tap (using the finger, the stylus, the mouse, or other device) at an URH location where the annotation is to end. In step 410, the quotation is annotated between the LLH location and the URH location. Finally, in step 412, the annotated quotation is displayed for the user's confirmation. At this point (not shown), the user may cancel, undo, or accept the annotated quotation. The process ends in step 414.

Therefore, as shown in FIGS. 2-4, a user of the present invention may implement a quotation selection, quotation cropping, and quotation annotation operation with very little hand motion and very little input into the device, which is highly desirable, or even mandatory, when operating in the field, for example, during an inspection operation.

Figure 5A:
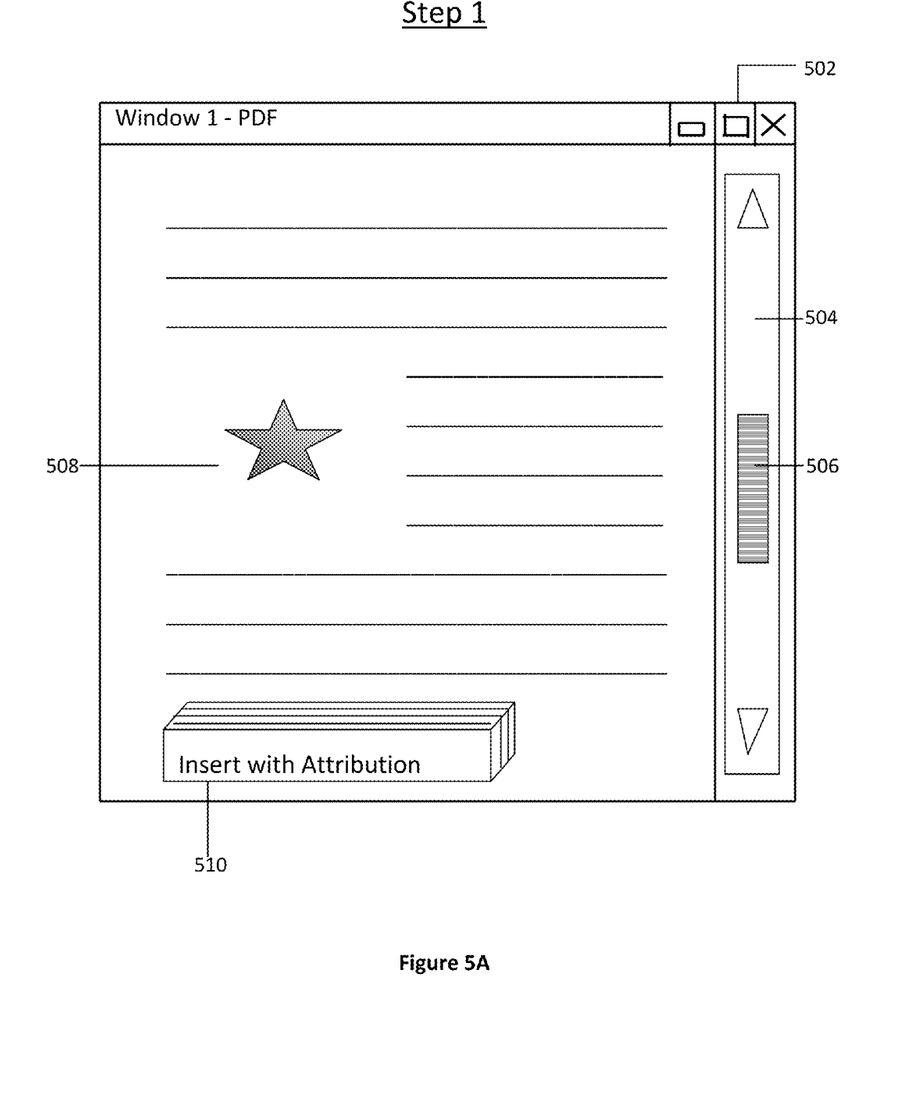
FIG. 5A shows a first step in the process for generating quotations from the reference document on the handheld device, in accordance with the embodiment referenced in FIG. 2.
Figure 5B:
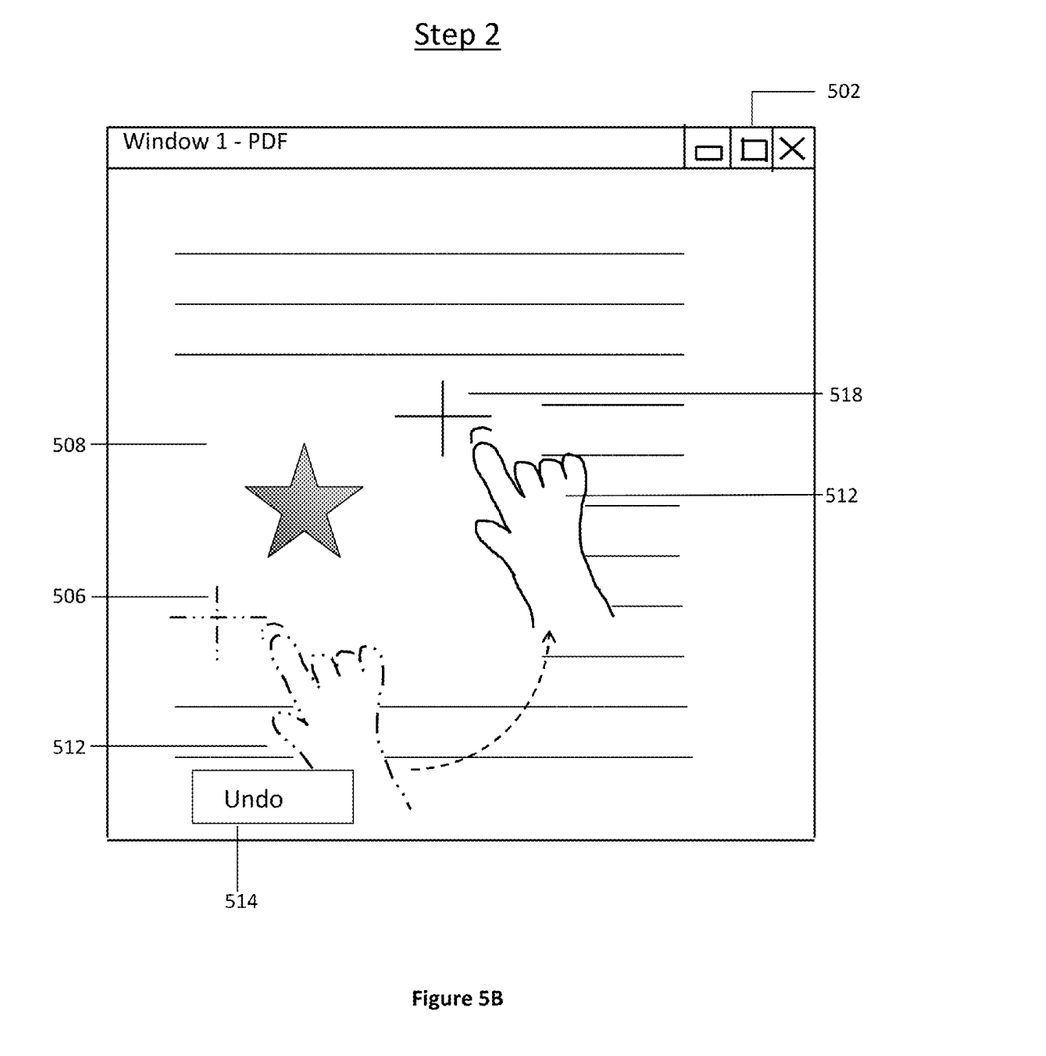
FIG. 5B shows a second step in the process for generating quotations from the reference document on the handheld device, in accordance with the embodiment referenced in FIG. 2.
Figure 5C:
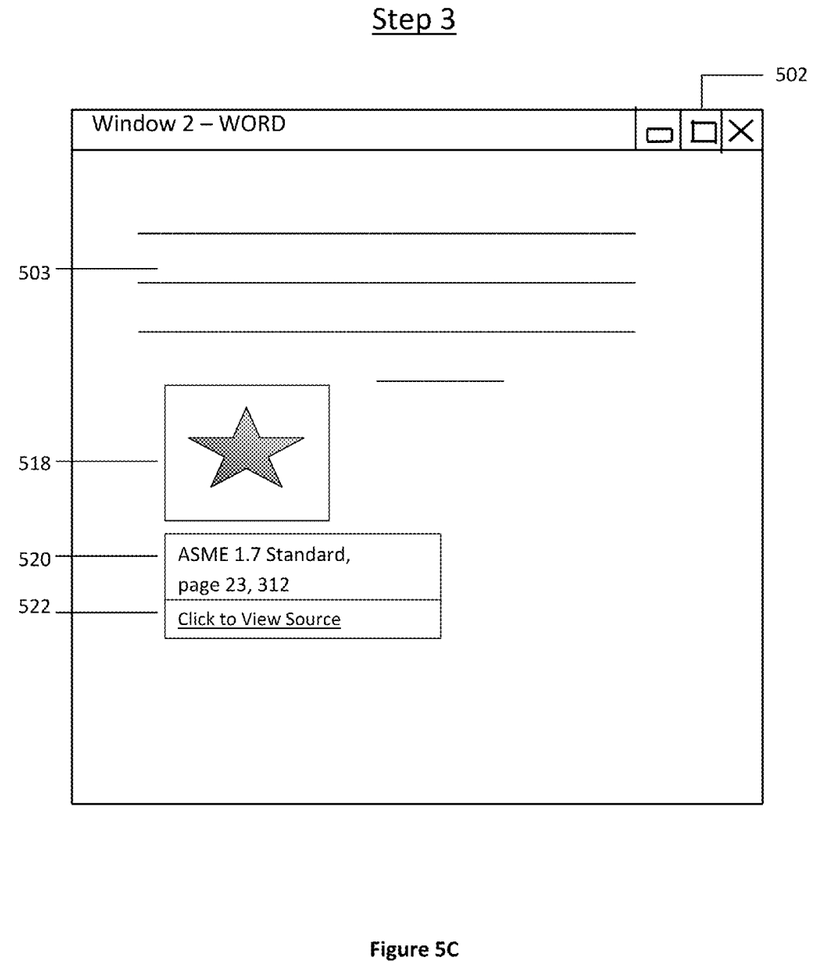
FIG. 5C shows a third step in the process for generating quotations from the reference document on the handheld device, in accordance with the embodiment referenced in FIG. 2.

FIGS. 5A-5C illustrate a sample workflow of inserting the quotation from the reference document in accordance with the embodiment referenced in FIG. 2. FIG. 5A shows a first step in the process for generating quotations from the reference document on the handheld device. Window 502 shows an open Adobe PDF® document, which could be a reference standard, a safety standard, an encyclopedia article, an information article, an ASME standards document, or other like reference document. Scroll bar 504 and slider 506 are used to scroll within the reference document. In addition, zoom-in, zoom-out, and search operations and other standard operations may be provided for viewing and navigating through the reference document (not shown). Element 508 shows an illustrative image located inside the reference document. Element 510 shows an illustrative iconographic button which may be activated to initiate the process of extracting a quotation from the reference document with attribution back to the reference document, as described in this application. Therefore, in the first step, a user navigates to a portion of the reference document that he or she wants to quote by using the standard navigation available in the reference document, and then clicks on element 510, which captures an image of the current view of the reference document.

FIG. 5B shows a second step in the process for generating quotations from the reference document on the handheld device. FIG. 5B shows the quotation selection step used to crop a quotation from the captured portion of the reference document 508. As explained in the co-pending patent application Ser. No. 12/507,039, which is herein incorporated by reference, a user may use a hand 512 (or a stylus, mouse, or other like device) to select a first point corresponding to a corner of the quotation to be cropped and via a simple hand movement, select a second point 518 corresponding to an opposite corner of the quotation to be cropped. An iconographic button 514 may be depressed to UNDO the crop operation and return to the captured portion of the reference document. As described in relation to FIG. 2, a second UNDO operation may return the user to the entire reference document which may be browsed for another quotation.

FIG. 5C shows a third step in the process for generating quotations from the reference document on the handheld device. After the user has accepted the quotation for insertion into the document being edited by the user, FIG. 5C shows the third and final step of automatically integrating the annotated quotation from the reference document into the document being edited by the user, including an automatically generated attribution (reference) back to the reference document and appropriate section within the reference document, as well as an optional computer-readable hyperlink back to the reference document and section within the reference document. More specifically, FIG. 5C shows Window 2 (502) showing a work-in-progress Microsoft Word® document, such as an inspection report 503, where a reference quotation 518 has been automatically inserted from the original reference Adobe PDF® document, as well as an automatically generated reference 520 back to the original reference document (including section and page number), and an automatically generated computer-readable hyperlink back to the original reference document (optionally pointing directly to the section within the reference document that the quotation was selected from).

Therefore, according to the inventive process described and illustrated with respect to FIGS. 5A-5C, a simple process is provided for inserting quotations with attribution back to the reference document, which simple process may be used on touch sensitive handheld devices or other handheld devices in the field for quick, accurate, and accountable generation of reports, inspections, and the like.

Figure 6:
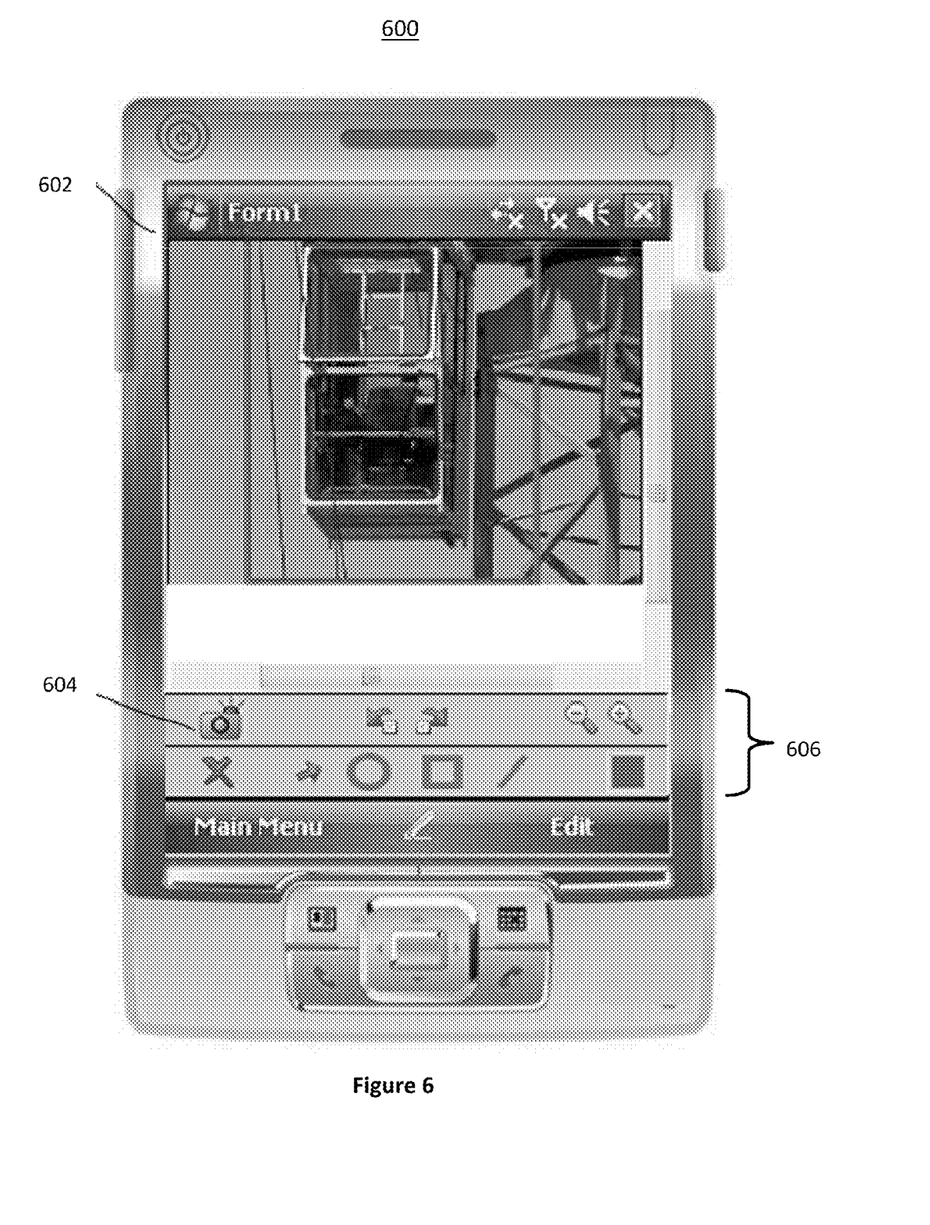
FIG. 6 is an illustration of a multi-functional handheld device, in which some of the software and hardware components of the present invention could reside, in accordance with yet another embodiment of the present invention.

FIG. 6 is an illustration of a multi-functional handheld device 600, in which some of the software and hardware components of the present invention could reside, in accordance with yet another embodiment of the present invention. The handheld device 600 contains a screen or display 602, which may be a touch-sensitive display, for displaying an image to be cropped and/or annotated with overlaid objects. The handheld 600 also contains a toolbar 606 that contains iconographic buttons for each function that a user may execute during a process of taking and editing an image. Some possible selectable actions include, but are not limited to, from top to bottom and left to right, "take a picture" 604 (first row, far left), undo, redo, zoom-in, zoom-out (first row, far right), delete/cancel (second row, far left), annotate with an arrow, annotate with a circle, annotate with a rectangle, annotate with a line, and crop (second row, far right). For example, if button 604 is pressed, the software activates the handheld device's digital camera and places the captured image in display screen 602.

The illustrative user interface 600 is but one of many possible illustrative embodiments of the present invention. One of ordinary skill in the art would appreciate that any other configuration of objects in a user interface, as well as any possible extensions to the set of functions presented in the user interface 600, are all within the spirit and scope of the present invention.

Figure 7:
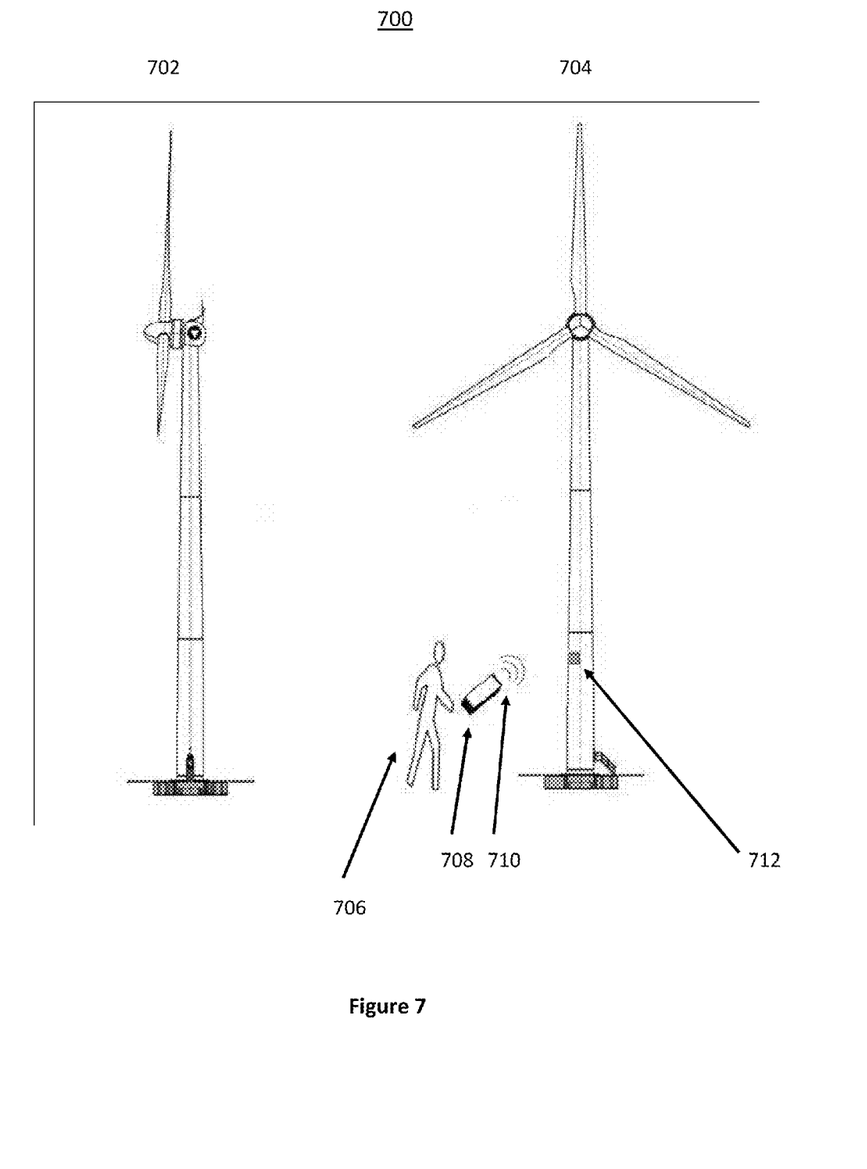
FIG. 7 is an illustration of one of many possible use-cases of the present invention in relation to carrying out an industrial inspection operation on a wind-farm or other energy project or other like site.

FIG. 7 is an illustration of one of many possible use-cases of the present invention in relation to carrying out an industrial inspection operation on a wind-farm or other energy project or other like site. FIG. 7 shows an inspector carrying out an inspection of wind turbine 702 and wind turbine 704. The inspector 706 is standing next to the tower and foundation sections of wind turbine 704. The inspector 706 is using an industrial inspection handheld device 708. Inspector 706 is more specifically in the process of using the industrial inspection handheld device 708, even more specifically having an embedded RFID reader, to scan RFID tag 712 on tower section of wind turbine 704, via radio frequency communication channel 710. Since inspector 706 is within proximity of the inspected component, he or she is able to successfully scan the RFID tag 712 because it is within the range of radio frequency communication channel 710. If the inspector recognizes a potential problem with the foundation section of the wind turbine 704, the inspection may take a picture of the potential problem area, and then proceed to crop and annotate the problem area using the methods described in the co-pending application Ser. No. 12/507,039, which is hereby incorporated by reference herein. Then, the inspector may generate one or more quotations from one or more reference documents, such as a crane safety manual, a crane load chart, an ASME safety standard, etc., in order to substantiate any problems found during the inspection, as described in the present application. Since the inspector is in the field, the present invention is particularly suitable to helping the inspector complete the inspection in a timely, accurate, and cost effective manner.

The illustration shown in FIG. 7 is but one of many possible illustrative embodiments of the usage of the present invention. One of ordinary skill in the art would appreciate that many possible uses of the present invention are all within the spirit and scope of the present invention, including, but not limited to, renewable energy systems and distributed energy systems, including wind turbines, solar photovoltaic, solar thermal plants, co-generation plants, biomass-fueled power plants, carbon sequestration projects, enhanced oil recovery systems, and the like.

Figure 8:
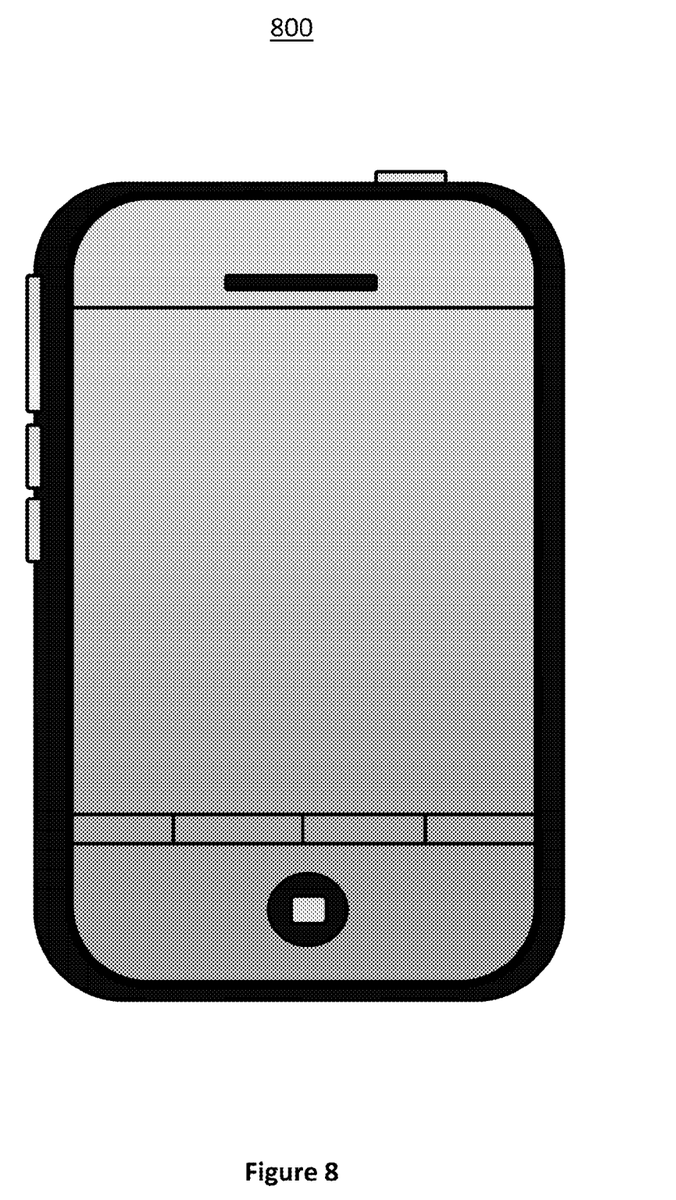
FIG. 8 is an illustration of yet another possible use-case of the present invention in relation to a hand-held device with a camera and a touch-sensitive display, such as an Apple iPhone® or other like device.

FIG. 8 is an illustration of yet another possible use-case of the present invention in relation to a hand-held device with a camera and a touch-sensitive display, such as an Apple iPhone® 800 or other like device. Users of an Apple iPhone® 800 may wish to generate quotations from a reference document directly on the iPhone® 800 from a document either stored on the iPhone® 800 itself or received from another user. The present invention is particularly suitable for use with an iPhone®, since an iPhone® as currently practiced does not contain a useful or easy mechanism for generating quotations from a reference document. As currently practiced, a user would need to upload the reference document from the iPhone® 800 to a computer for further desktop processing to extract and insert a quotation from the reference document.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

What is claimed is:

1. A method for generating quotations from a reference document in an inspection compliance system to ensure inspection compliance, the method comprising the steps of:
   scanning a unique machine-readable tag deployed at a logical inspection point defined by an inspector;
   capturing a media sample of the logical inspection point defined by the inspector which identifies a potential problem at the logical inspection point;
   associating the media sample with a corresponding scan of the unique machine-readable tag;
   providing a reference document;
   capturing an image of a portion of the reference document;
   editing the captured portion of the reference document;
   generating a quotation comprising an image quotation and a bibliographical reference to a referenced section of the reference document which contains the image quotation in order to substantiate the potential problem identified in the media sample; and
   providing the quotation, the unique machine-readable tag, and the media sample to the inspection compliance system to substantiate statements of problems found during an inspection.

2. The method as recited in claim 1, wherein editing the captured portion of the reference document further comprises:
   cropping the captured portion of the reference document.

3. The method as recited in claim 1, wherein editing the captured portion of the reference document further comprises:
   annotating the captured portion of the reference document.

4. The method of claim 2, wherein cropping the captured portion of the reference document further comprises:
   displaying the captured portion of the reference document to be cropped;
   receiving a first input from a user designating a first point in the captured portion of the reference document defining a corner of a crop rectangle;
   receiving a second input from the user designating a second point in the captured portion of the reference document defining an opposite corner of the crop rectangle; and
   cropping the captured portion of the reference document from the first point to the second point of the crop rectangle when the second input is released.

5. The method as recited in claim 4, wherein if the user does not immediately release the second input, allowing the user to drag the second point to visually edit a shape and a size of the crop rectangle.

6. The method as recited in claim 4, wherein if the user drags the second point near an edge of a displayed portion and the reference document is larger than the displayed portion, then scrolling the displayed portion to show a larger portion of the reference document in a direction of the dragged point.

7. The method of claim 3, wherein annotating of the captured portion of the reference document further comprises:

displaying the captured portion of the reference document to be annotated;

receiving a first input from a user designating a first point in the captured portion of the reference document defining a corner of an annotation rectangle;

receiving a second input from the user designating a second point in the captured portion of the reference document defining an opposite corner of the annotation rectangle; and annotating the captured portion of the reference document from the first point to the second point of the annotation rectangle when the second input is released.

8. The method as recited in claim 7, further comprising: displaying a shape corresponding to the annotation rectangle of the captured portion of the reference document before annotating the captured portion of the reference document.

9. The method as recited in claim 7, wherein if the user does not immediately release the second input, allowing the user to drag the second point to visually show a shape and a size of the annotation rectangle.

10. The method as recited in claim 7, wherein if the user drags the second point near an edge of a displayed portion and the reference document is larger than the displayed portion, then scrolling the displayed portion to show a larger portion of the reference document in a direction of the dragged point.

11. The method of claim 2, wherein when the user selects an undo action after a crop operation has been completed, the entire original captured portion of the reference document is displayed.

12. The method of claim 11, wherein when the user selects an undo action a second time after a crop operation has been completed, the original reference document is displayed again.

13. The method of claim 1, further comprising: generating a computer-readable link that refers back to the referenced portion of the reference document.

14. The method of claim 1, wherein if text selection is meaningful for the reference document, a user can perform a text quotation.

15. The method of claim 14, wherein the text quotation is obtained by selecting a region of text.

16. The method of claim 15, wherein the selected text may be edited by the user.

17. The method of claim 16, wherein after the user finalizes the text quotation, the edited text is saved along with a bibliographic reference to the referenced portion of the reference document.

18. A touch-sensitive hand-held system having a capability of generating quotations from a reference document for use in an inspection compliance system to ensure inspection compliance, comprising:

at least one processor; and at least one or more memories, operatively coupled to the processor, and containing program code, which when executed causes the processor to execute a process comprising the steps of:

scanning a unique machine-readable tag deployed at a logical inspection point defined by an inspector;

capturing a media sample of the logical inspection point defined by the inspector which identifies a potential problem at the logical inspection point;

associating the media sample with a corresponding scan of the unique machine-readable tag;

providing a reference document;

displaying the reference document;

capturing an image of a portion of the displayed reference document;

editing the captured portion of the reference document;

generating a quotation comprising an image quotation and a bibliographical reference to a referenced portion of the reference document which contains the image quotation in order to substantiate the potential problem identified in the media sample; and providing the quotation, the unique machine-readable tag, and the media sample to the inspection compliance system to substantiate statements of problems found during an inspection.

19. The system of claim 18, further comprising:

generating a computer-readable link that refers back to the referenced portion of the reference document.

20. The system of claim 18, wherein if text selection is meaningful for the reference document, a user can perform a text quotation by selecting and then editing a region of text.

* * * * *